May 11, 1926.

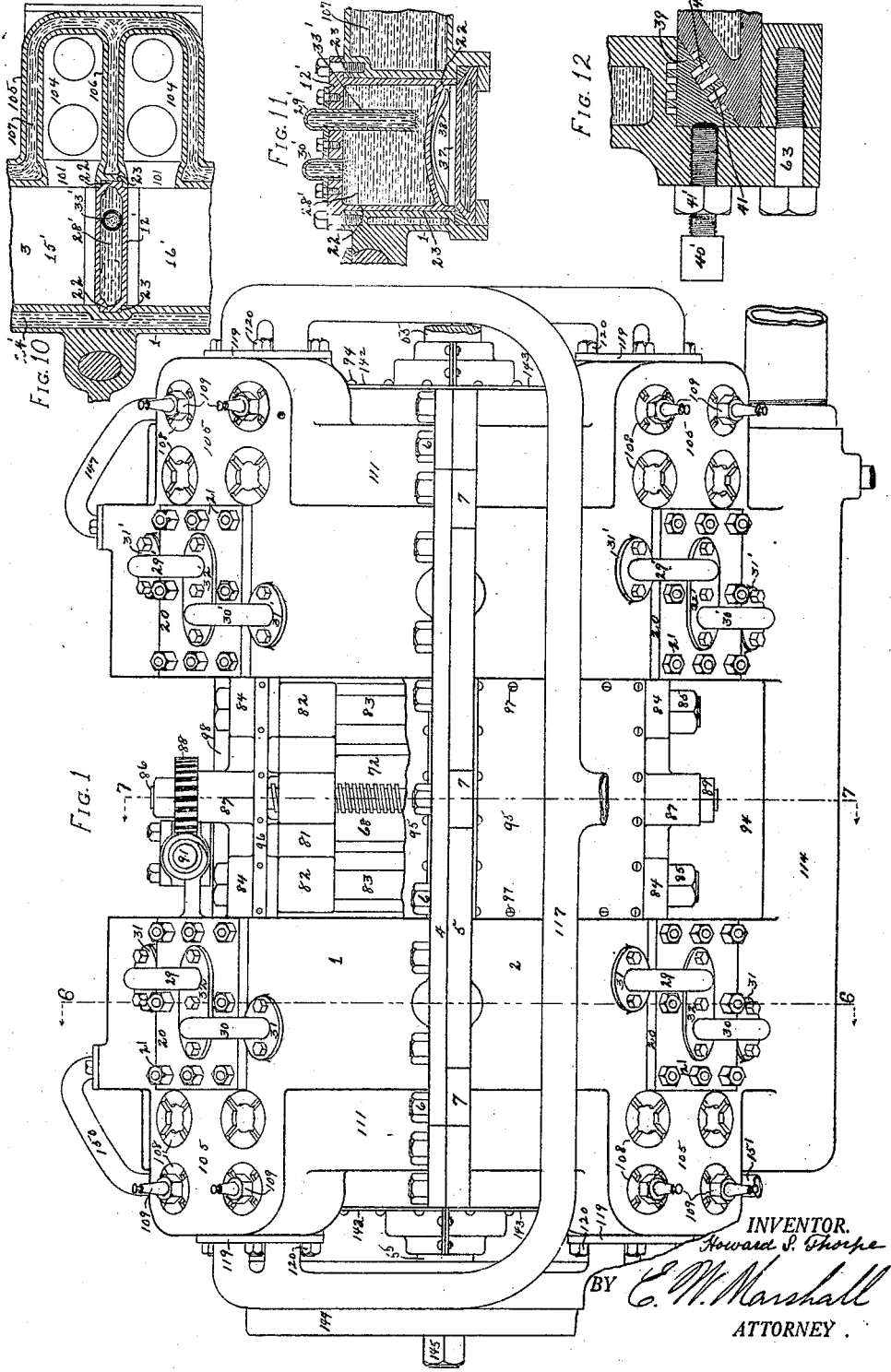

H. S. THORPE

ENGINE

Filed August 31, 1921  7 Sheets-Sheet 2

1,584,567

INVENTOR.
Howard S. Thorpe
BY
ATTORNEY.

May 11, 1926.
H. S. THORPE
ENGINE
Filed August 31, 1921 7 Sheets-Sheet 3
1,584,567
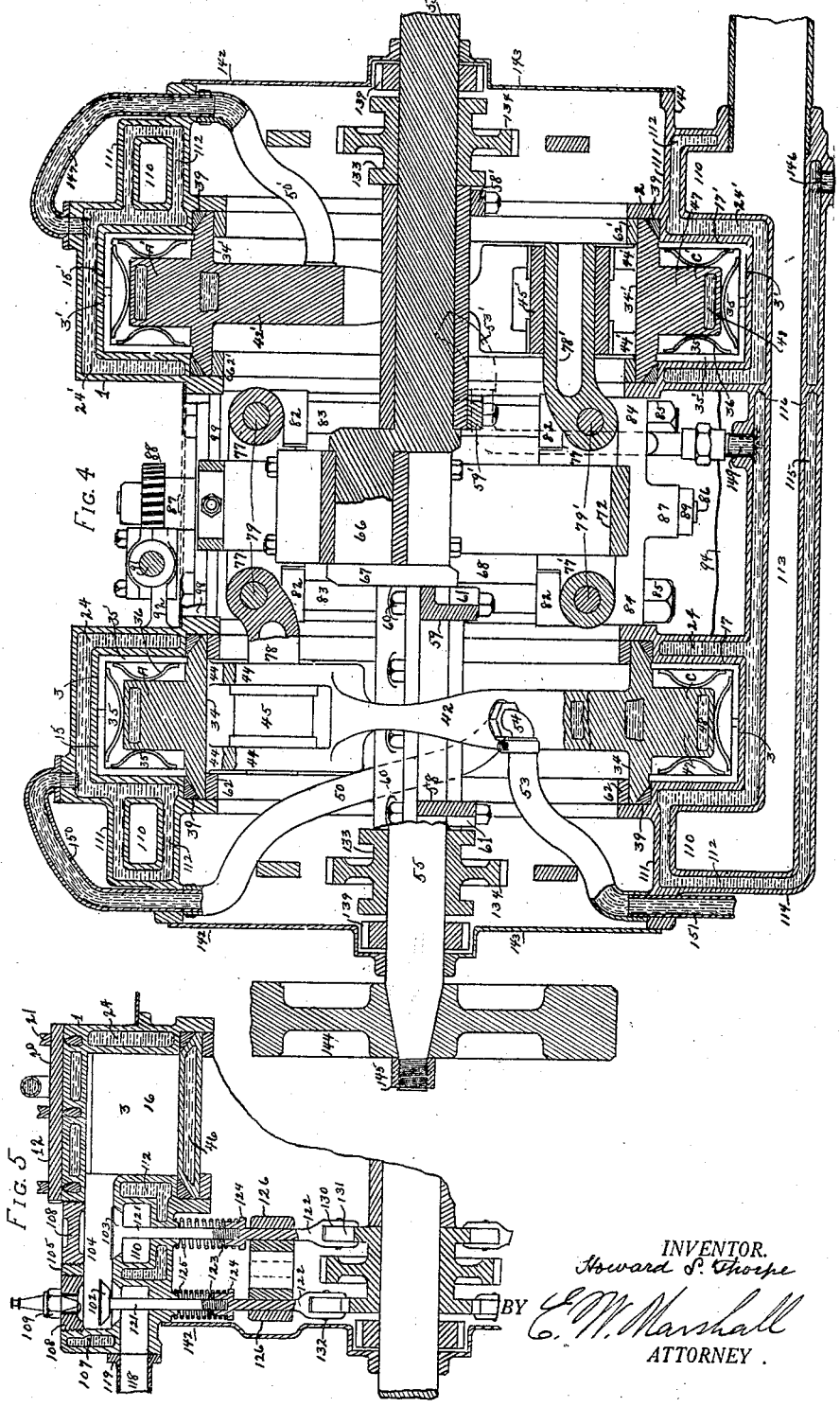

May 11, 1926. 1,584,567
H. S. THORPE
ENGINE
Filed August 31, 1921 7 Sheets-Sheet 4
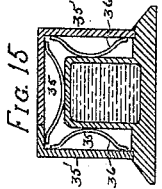
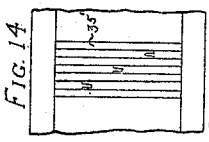
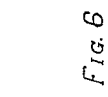
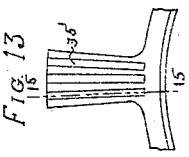
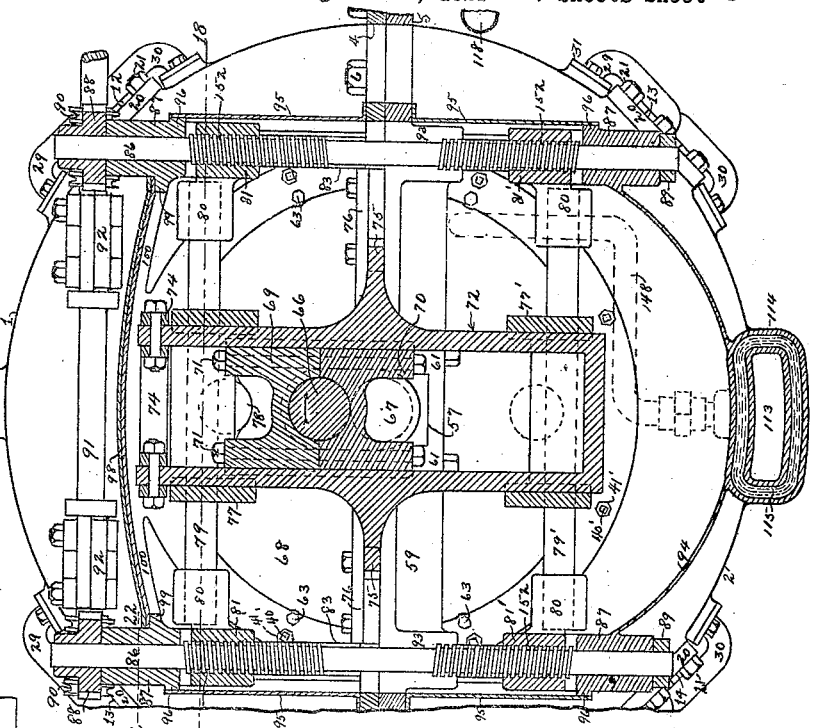
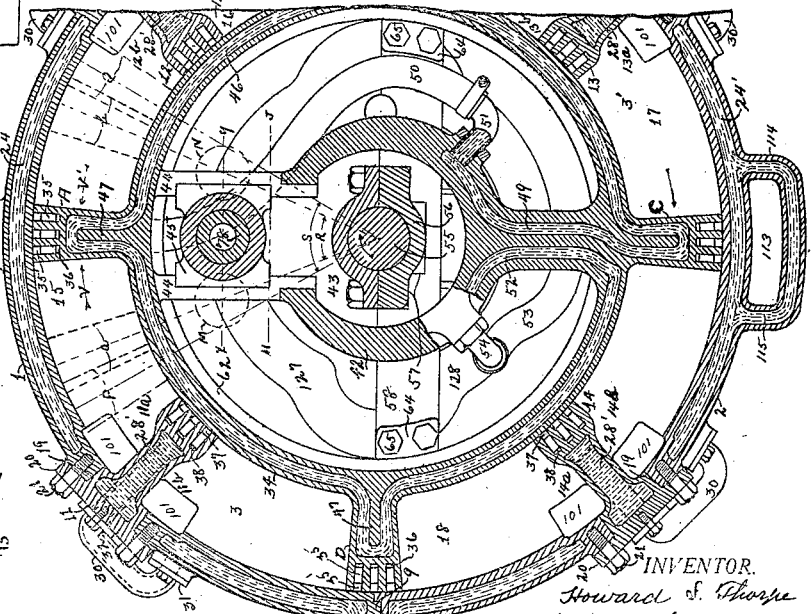
INVENTOR.
Howard S. Thorpe
BY E. W. Marshall
ATTORNEY

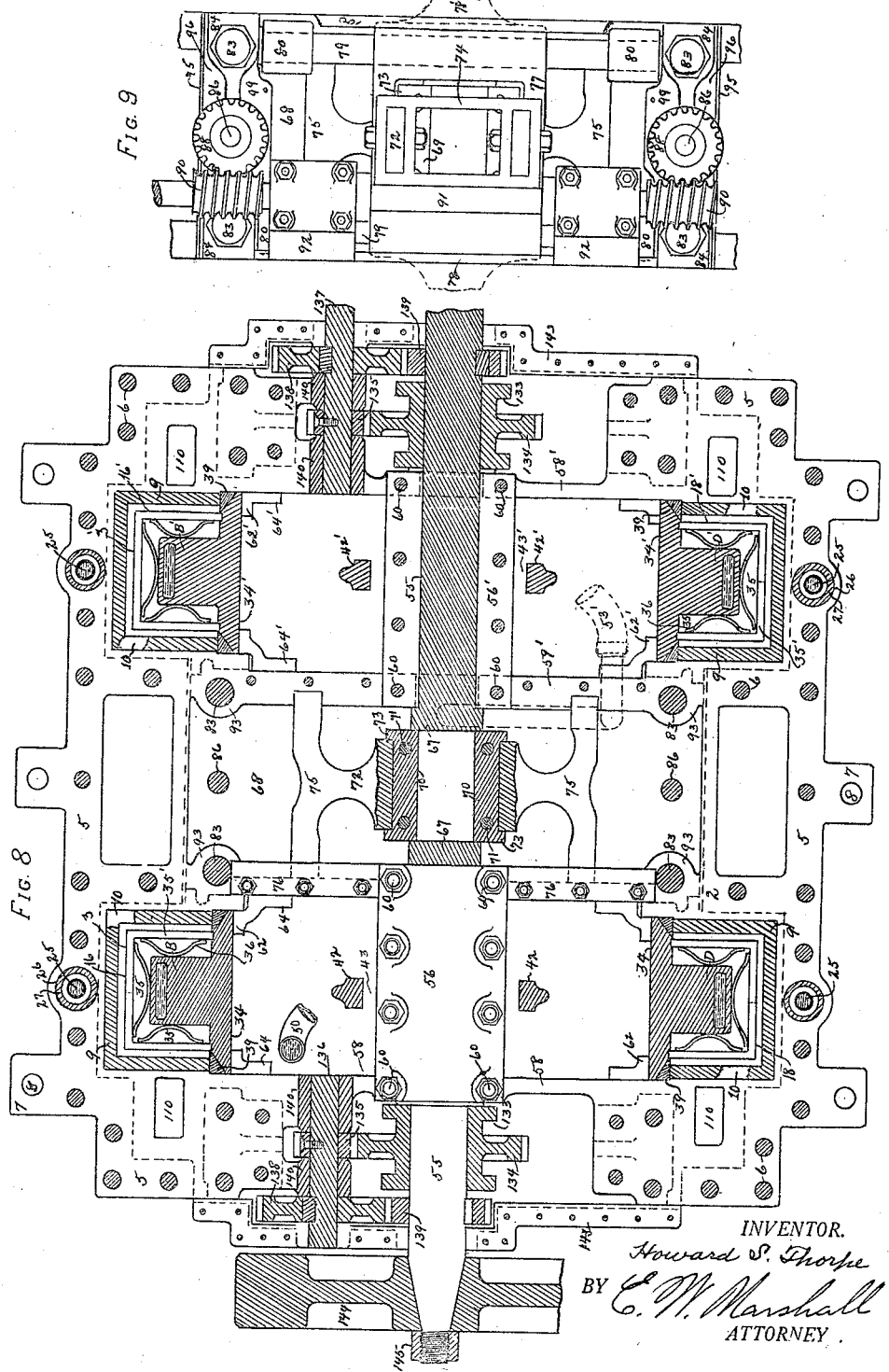

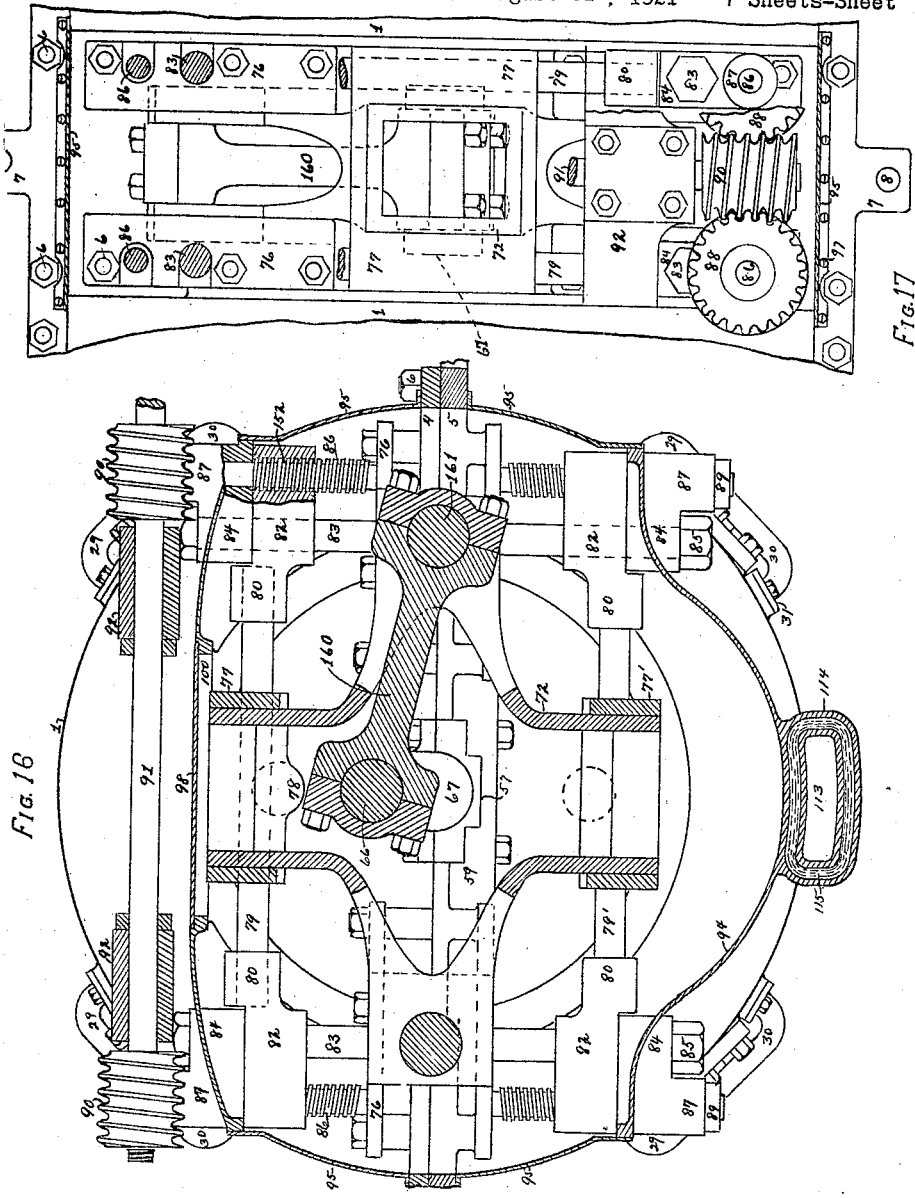

May 11, 1926.
H. S. THORPE
1,584,567
ENGINE
Filed August 31, 1921    7 Sheets-Sheet 7
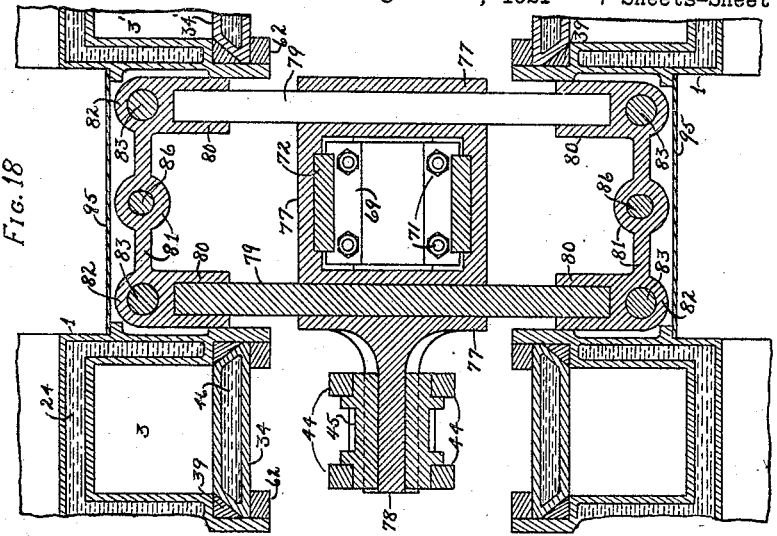
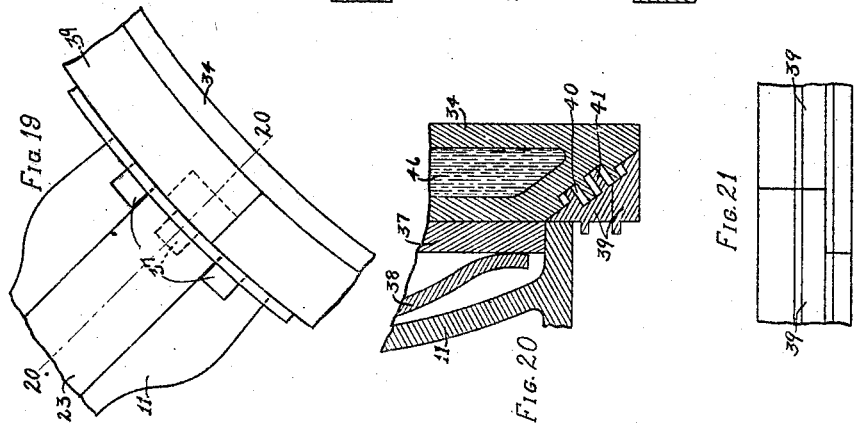
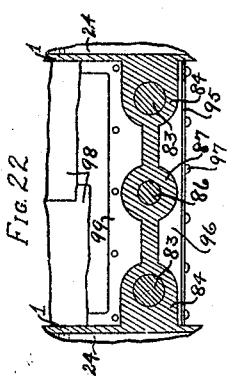
INVENTOR.
Howard S. Thorpe
BY E. W. Marshall
ATTORNEY.

Patented May 11, 1926.

1,584,567

UNITED STATES PATENT OFFICE.

HOWARD S. THORPE, OF YONKERS, NEW YORK.

ENGINE.

Application filed August 31, 1921. Serial No. 497,115.

This invention relates to engines and will be particularly described with reference to engines of the internal combustion type.

One of the objects of the invention is to provide an engine capable of delivering a maximum amount of power for a minimum weight.

Another object of the invention is to provide an engine that will be compact and will occupy a small amount of space.

Another object of the invention is to provide an engine, preferably of the internal combustion type, in which the piston stroke or combustion space may be varied and, furthermore, may be varied while the engine is in operation.

Another object of the invention is to provide an engine in which the moving parts are balanced and therefore exceptionally free from vibration.

Another object of the invention is to provide an internal combustion engine that may be adapted to operate efficiently on different grades of fuel and in different altitudes when used in aeroplanes.

Briefly described, the invention as illustrated comprises an engine having one or more cylinders, disposed circumferentially around the crank shaft, each cylinder having a piston therein. As shown, the pistons are double acting and each cylinder has an inlet and exhaust valve at each end thereof. In the particular form illustrated, the cylinders are formed by partitions in an annular chamber. The pistons are connected to the crank shaft in such a manner that the stroke may be varied at will while the engine is operating and this adjustment also varies the compression space in the cylinders. Means is also provided for cooling the engine by circulating a cooling medium around the cylinders, through the cylinder heads and through the pistons.

Referring to the drawings:
Fig. 1 is a side elevation of the engine with a part of one of the side covers removed.

Fig. 4 is a longitudinal section taken substantially on line 4—4 of Fig. 3, and looking in the direction indicated by the arrows.

Fig. 5 is a section taken substantially on line 5—5 of Fig. 2.

Fig. 6 is a sectional elevation taken substantially on the line 6—6 of Fig. 1.

Fig. 7 is a sectional elevation taken substantially on the line 7—7 of Fig. 1, looking in the direction indicated by the arrows.

Fig. 8 is a horizontal cross section of the engine taken through the center line of the shaft.

Fig. 9 is a top view of the central portion of the engine with the top covers removed.

Fig. 10 is a detail section taken substantially on the line 10—10 of Fig. 3.

Fig. 11 is a detail section taken substantially on the line 11—11 of Fig. 3.

Fig. 12 is an enlarged detail section taken through a packing ring and one of the adjusting set screws.

Fig. 13 is an end elevation of a piston.

Fig. 14 is a top plan view of a piston.

Fig. 15 is a section through a piston taken substantially on line 15—15 of Fig. 13.

Fig. 16 is a sectional elevation similar to Fig. 7 but showing a modified form of crank shaft connections.

Fig. 17 is a plan view of the construction shown in Fig. 16.

Fig. 18 is a section taken substantially on line 18—18 of Fig. 7.

Fig. 19 is a plan view of a portion of one of the packing rings between the piston body member and the annular chamber and the coacting parts.

Fig. 20 is a detail sectional view on an enlarged scale, taken substantially on line 20—20 of Fig. 19 and showing the overlapping ends of the ring.

Fig. 21 is a side elevation of the packing rings shown in Fig. 19.

Fig. 22 is a sectional elevation taken substantially on line 22—22 of Fig. 7.

Like reference characters denote like parts throughout the several views.

Figure 3:
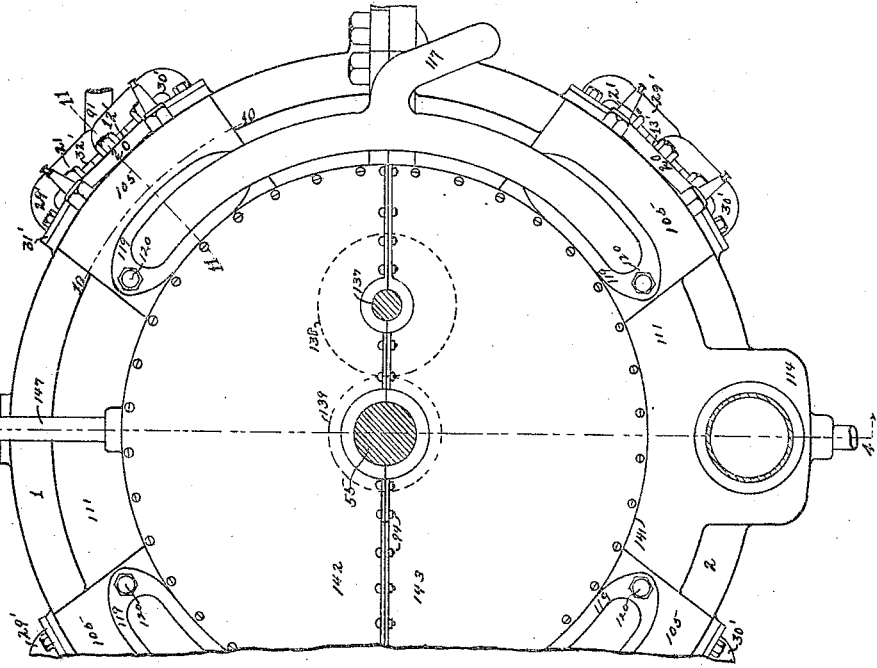
Fig. 3 is an end elevation of the opposite end of the engine.

Referring to Fig 1, the engine casing comprises an upper casting 1 and a lower casting 2. Each casting has two chambers 3 and 3', each chamber forming a half of a annular ring, preferably square or rectangular in cross section, and the chambers are accurately machined. The upper casting has a flange 4 secured to a correspoding flange 5 on the lower casting by nuts 6 on studs carried by the flange 5 and extending through flange 4.

The flange 5, as shown in Fig. 8, has extensions 7 having holes 8 through which bolts may be passed to secure engine to a foundation.

When bolted together the two chambers 3 and 3' in each casting register with each other and form annular chambers which constitute or form the cylinders of the engine, as hereinafter described. The casings of the annular chambers 3 and 3' are spaced laterally, as shown at 68, and the crank and yoke are positioned between the two sets of casings as will hereinafter be described.

To keep the upper casting 1 and the lower casting 2 in proper alinement and to prevent the leakage of gas from the annular chambers, the upper casting 1 is provided, as shown in Figs. 6 and 8, with lugs 9, which rest on the lower casting and which extend around the three sides of the annular chambers 3 and 3' and fit accurately in corresponding grooves 10 cut in the upper surface of the lower casting 2 around the three sides of the annular chambers formed by chambers 3—3 and 3'—3'. To facilitate the description the annular chambers formed by chambers 3—3 and 3'—3' will be hereafter described respectively as annular chambers 3 and 3'.

Each annular chamber may be divided by partitions into as many equal, separate segmental chambers as desired, these chambers forming the cylinders of the engine. The number of the cylinders in each annular chamber is governed by the stroke required.

For the purpose of illustrating the invention, the annular chamber 3—3 is divided by partitions 11, 12, 13 and 14, hereinafter called "cylinder heads", into four cylinders 15, 16, 17, and 18. Likewise the annular chamber 3' is divided by the four cylinder heads 11', 12', 13', and 14' into the four cylinders 15', 16', 17' and 18'.

As shown in Fig. 6, the cylinder heads fit accurately in slots 19 cut in the outer surfaces of the annular chambers 3 and 3' and have flanges 20 which are bolted to the castings 1 and 2 with the bolts 21. To prevent leakage of gas past the cylinder heads, the two surfaces of the cylinder heads which come in contact with the two walls of the annular chambers, as shown in Figs. 10 and 11, are fitted with lugs 22 which fit accurately into corresponding grooves 23 in the walls of the annular chambers.

The castings 1 and 2 are formed with a water jacket 24 extending around and covering the three surfaces of annular chamber 3 and with a water jacket 24' extending around and covering the three surfaces of annular chambers 3'. To prevent leakage of water into the cylinders, the water jackets 24 and 24' are interrupted in the outer surfaces of the annular chambers by the cylinder heads, and around the three surfaces or walls of the annular chambers at the contact surfaces where the castings 1 and 2 come together. As shown in Figs. 6 and 8, the water jacket spaces of the upper and lower castings are connected by the passages 25 which pass outside of the lugs 9. The passages 25 are encircled by grooves 26 cut in the flanges 4 and 5 of the castings. Into these grooves 26 metallic packing rings 27 are accurately fitted with rings of packing 28 above and below the rings 27, the packing being forced tightly against the rings 27 when the two castings are bolted together.

Figure 2:
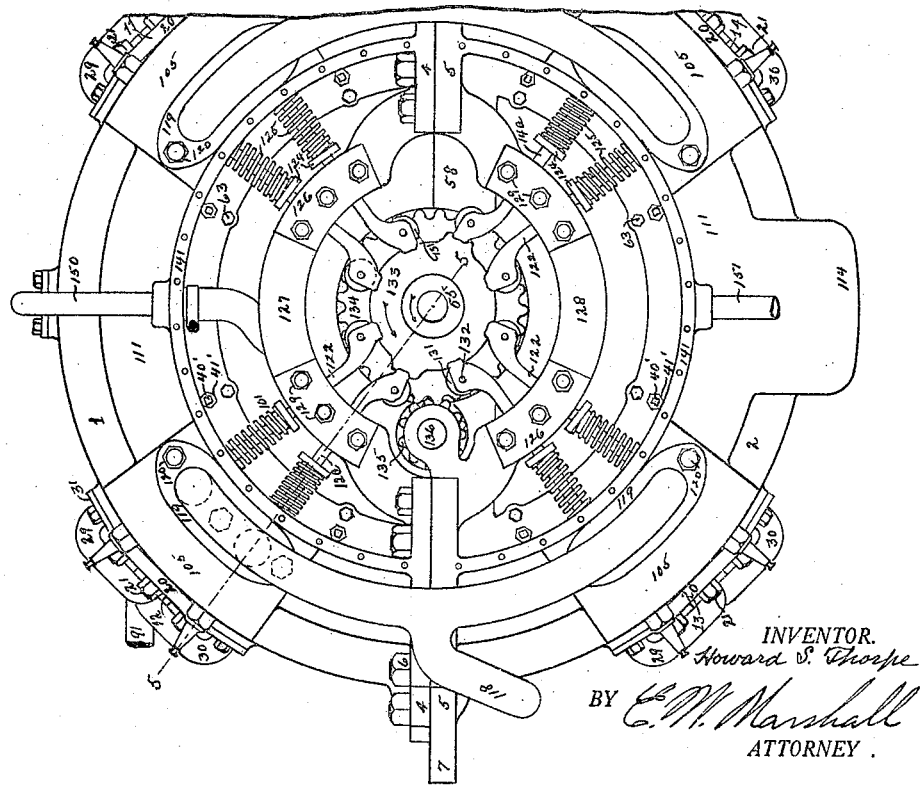
Fig. 2 is an end elevation of the flywheel end of the engine with the flywheel, and covers and a part of the gearing removed.

The cylinder heads have waterjacket spaces 28' formed therein which connect respectively with the water jacket spaces 24 and 24' by means of pairs of pipes 29 and 30 and 29' and 30' shown particularly in Figs. 1, 2, 3 and 6. The pipes 29 and 30 have flanges 31 bolted to the main castings and common flanges 32 bolted to the cylinder heads. Likewise the pipes 29' and 30' have flanges 31' bolted to the main castings and common flanges 32' bolted to the cylinder heads.

Referring to Fig. 11, to provide a thorough circulation of water through the cylinder heads, the pipes 29 and 29' have elongations 33 and 33' extending almost to the inner ends of the water jacket spaces and taking the water from the inner ends of the water jacket spaces, while the pipes 30 and 30' deliver the water to the outer ends of the water jacket spaces.

Having described the cylinder construction, I will now describe the piston structure.

Accurately fitting the walls and outer surfaces of the cylinders 15, 16, 17, and 18, are four pistons A, B, C, and D. These four pistons, as shown in Figs. 4 and 6, are secured to and project outwardly from the outer surface of a cylindrical shaped body 34 which will hereinafter be called the "piston body" or "body member". Likewise accurately fitting the walls and outer surfaces of the cylinders 15', 16', 17' and 18' are four piston A', B', C' and D', these four pistons forming four projections on the outer surface of the piston body 34'. The piston bodies 34 and 34' form the inner wall of and close the annular chambers 3 and 3' completing the cylinders 15, 16, 17 and 18, and the cylinders 15', 16', 17' and 18'. The piston bodies accurately fit against the walls and outer surfaces of the cylinders.

As shown in Figs. 13 and 14, the three surfaces of the pistons that come in contact with the side walls and outer surfaces of the cylinders are slotted, as indicated at 35 (three slots being shown). Into these slots are accurately fitted angular piston "rings" 35', each "ring" being formed in two parts. Each part extends along one side of the piston and partly across the outer surface, forming an angle at the corner of the piston, and the two parts of the ring overlap on the outer surface of the piston. The overlapping parts of the rings 35' are spaced or staggered so as not to come opposite each other.

The rings are pressed out against the walls and outer surfaces and the outer corners of the cylinders by springs 36. These rings prevent the leakage of gas or other fluid past the pistons. The rings extend a short distance inside the outer surface of the piston bodies so that no gas can escape past the ends.

As shown in Figs. 6 and 11, the inner surfaces of the cylinder heads are similarly slotted and fitted with packing members 37 resiliently actuated by springs 38 into engagement with the outer cylindrical surface of the piston body member. The members 37 are straight and extend slightly beyond the walls of the cylinder heads and prevent leakage of gas past the inner surfaces of the cylinder heads.

As shown in Figs. 8, 11 and 12, the outer corners of the piston body members 34 and 34' extend beyond the sides of the annular chambers and are cut off and in the triangular space between the body members 34 and 34' and the castings 1 and 2 are fitted metallic packing members or "rings" 39, shown particularly and in detail in Figs. 12, 19, 20 and 21. Each packing "ring" 39 has its ends overlapping in the common and well known manner. The surfaces of contact of the piston body members and of the packing rings 39 are formed, respectively, with grooves 40 and lugs 41, the lugs on the packing ring registering or working in corresponding grooves on a piston body member and vice versa. Corresponding lugs and grooves are formed on another side of the ring and the adjacent surface of the annular chamber, as shown in Figs. 12 and 21. In each instance the width of a groove is greater than the width of the lug that works in it to allow the packing rings to be set up as they wear. The packing rings are of softer metal than the piston bodies so that they receive the wear. The rings are adjusted and the wear taken up by means of the set screws 40' locked by lock nuts 41'. The purpose of the grooves and lugs is to reduce the frictional surfaces and make it more difficult for any gas or fluid to escape along the lines of contact between the piston body members and the cylinders.

The piston body member 34, as shown in Figs. 6 and 7, has formed thereon or secured thereto a member 42 diametrically extending across it, hereinafter termed the piston yoke. The piston yoke 42 has a central circular opening 43 through which the crank shaft extends. The circular portion is slotted at its upper part and four parallel arms 44 are secured to the end of the yoke. The arms 44 are arranged in two pairs and form guides for a sliding bearing 45, confining the movement of the bearing. Likewise the piston body 34' is formed with a piston yoke 42' with a central circular opening 43'. The lower portion of the piston yoke 42', instead of the upper portion as in the other piston yoke, has four parallel arms 44' which form guides for the sliding bearing 45'.

As shown in Fig. 6, the piston body 34 and the pistons A, B, C and D, are formed with a water jacket space 46, which extends around the piston body and into each piston, the water being directed into the pistons by the partitions 47 across the pistons. The partitions have openings 48 in their outer ends through which the water circulates. Water is admitted to a passage 49 in the piston yoke 42 through a hose 50, connection being made between the hose and yoke by an elbow nipple 51. The water then circulates entirely around the piston body member and various pistons and is taken out through a passage 52 in the piston yoke and a hose 53 which is connected to the yoke by means of an elbow nipple 54. Likewise the piston body 34' and the pistons A', B', C' and D' are formed with similar water jackets and with similar water passages in the piston yoke. The water is admitted to the piston yoke 34' by the hose 50' and taken out through the hose 53'.

The crank shaft 55, as shown in Figs 4 and 8, passes through the axial center of the castings 1 and 2 and through the central openings 43 and 43' in the piston yokes 42 and 42'. The shaft 55 turns in bearing boxes 56 and 56' mounted in slots 57 cut in the bearing supports 58 and 59 and 58' and 59' which form a part of and extend diametrically across the lower casting 2. The shaft bearings 56 and 56' are secured to the supports 58 and 59 and 58' and 59' by bolts 60 at each end of each bearing and passing through lugs 61 formed on the supports.

Two rims 62 are bolted to the castings 1 and 2 by bolts 63 and are formed with flanges 64 which are bolted to the supports 58 and 59 by the bolts 65. These rims bear against the inner surface of the piston body member and assist in supporting the member. Likewise the rims 62' give bearing support to the piston body 34' and are bolted in similar manner to the castings 1 and 2 and the bearers 58' and 59'.

The crank on the shaft 55 consists of a crank pin 66 and crank arms 67 and turns between the bearings 56 and 56' in the space 68 between the casings of the annular chambers 3 and 3'. As shown in Fig. 7, the crank pin 66 works in a sliding bearing, the upper part 69 of which is bolted to the lower part 70 by the bolts 71. The bearing is free to slide up and down in a yoke 72 which will hereinafter be called the shaft yoke to distinguish it from the piston yoke. Lugs 73 (see Fig. 8), on the bearing 69—70 prevent a longitudinal movement of the bearing. The upper end of the shaft yoke 72 is left open to admit the bearing 69—70 and is closed and braced after the bearing is admitted by a connecting member 74. The shaft yoke 72 has two arms 75 extending laterally from its central part and these arms are slidably supported on bearing supports 59 and 59', being secured against upward displacement by plates 76 bolted to the members 59 and 59'.

As shown in Figs. 4, 7 and 18, around the upper part of the shaft yoke 72 is fitted a frame 77 which has an arm 78 extending into the sliding bearing 45 in the piston yoke 42. The frame 77 slides along horizontal guide rods 79. Likewise around the lower part of the shaft yoke 72 is fitted a frame 77', which has an arm 78' extending into the sliding bearing 45' in the piston yoke 42'. The frame 77' slides along lower horizontal guide rods 79'. As shown in Fig. 18, the guide rods 79 and 79' are carried by sockets 80 formed in members 81 which join the two upper guide rods 79. The guide rods 79 and the members 81 thus form a rectangular frame (see Fig. 18), which supports and guides the frame 77. The members 81 are formed with sleeves 82 on their ends which slide vertically on four vertical guide rods 83. These guide rods 83 pass through sockets 84 (see Fig. 22), on the castings 1 and 2, the tops of the guide rods being headed and the bottoms threaded and secured by the nuts 85. In like manner the two lower horizontal guide rods 79' are joined by the members 81' of which the sockets 80 form parts. The guide rods 79' and the members 81' thus form a rectangular frame which supports and guides the frame 77'. The members 81' are formed with sleeves 82' in their ends which slide vertically on the guide rods 83. Through the center of the members 81 and 81' midway between the guide rods 83 are vertical tapped holes 152, the upper members 81 having right hand or left hand threads and the lower members 81 having the opposite threads. Through these threaded holes 152 pass the vertical rods 86, each rod having opposite threads on the upper and lower ends corresponding to the threads on the respective members through which it passes. The members 86 pass through and are rotatable in sleeves 87 in the castings 1 and 2, the sockets 84 and the sleeves 87 being connected together, bridging the space 68 and joining the annular chambers of each casting 1 and 2, as shown in Fig. 22. Worm gears 88 are secured to the upper ends of the rods 86 and rest on the upper sleeves 87. Collars 89 are pinned to the lower ends of the rods 86 to secure the rods against upward movement. The worm gears 88 engage worms 90 keyed to or formed on shaft 91, which is mounted in bearings 92. The bearings 92 are formed in lugs extending from the upper part of casting 1. The shaft 91 may be rotated by a hand wheel (not shown) or by an electric starter or any other suitable power. When the shaft 91 is rotated the frames 77 and 77' uniformly approach each other or recede from each other, the lugs 93 on the casting 2, through which the guide rods 83 pass, forming stops in the first case and the sockets 84 forming stops in the second case.

The space 68 between the casings of the annular chambers 3 and 3' is enclosed at the bottom by a casing or plate 94 extending across the space and forming part of the casting 2. The sides are closed by the removable plates 95 fastened to projections 96 on the members containing the sockets 84 and the sleeves 87 and to the flanges 4 and 5 by the machine screws 97. The top is closed by two removable plates 98 fastened to projections 99 on the members containing the sockets 84 and the sleeves 87 and to projections 100 on the casting 1. One of the plates 98 overlaps the other along the center to secure tightness, two plates being used instead of one giving access to the engine by the removal of one plate.

The valve mechanism will next be described and attention is particularly directed to Figs. 5, 6 and 10.

Gas is admitted to the cylinders on each side of each cylinder head through ports 101 by the inlet valves 102 and exhausted from the cylinders through the same ports by the exhaust valves 103. There is one inlet valve 102 and one exhaust valve 103 in a common valve chamber 104 on each side of each cylinder head, the two common valve chambers 104 being inclosed in extensions 105 of the castings 1 and 2. The valve chambers in each extension 105 are separated by the partitions 106. The walls and partitions of the extensions 105 are formed with water jackets 107 which join with and form part of the water jackets 24 and 24' of the cylinders. Each valve chamber 104 is provided with threaded plugs 108 through which the exhaust valves 103 may be taken out or ground, should occasion require, and with threaded plugs 108 through which the inlet valves may be taken out. Each plug 108 over each inlet valve is drilled and tapped to take a spark plug 109. The spark plugs may be connected to a magneto or other suitable source of current (not shown). Each of the set of eight valve chambers 104 for each annular chamber 3 and 3' is connected with an exhaust chamber 110, the exhaust chambers 110 being formed in extensions 111 of the castings 1 and 2 and joining and forming part of the extensions 105. The exhaust chambers 110 are formed with water jackets 112 which join with and form part of the water jackets 24 and 24' and 107. Admission from the valve chambers 104 to the exhaust chambers 110 is controlled by the exhaust valves 103. As shown in Fig. 4, the exhaust chambers are connected by a passage 113 in an extension 114 in the bottom of casting 2, the extension being formed with a water jacket 115 which joins and forms part of the water jackets 24 and 24' and 112. The partition 116 in the water jacket 115 separates the water jackets of the two annular chambers.

Gas is supplied to the valve chambers 104 by the gas manifolds 117 and 118. The manifold 117 is connected to four valve chambers of the annular chamber 3 and to four valve chambers of the annular chamber 3' to one side of the center of the engine and the manifold 118 is connected to the other valve chambers of the annular chambers 3 and 3' on the other side of the center line of the engine. The flanges 119 of the manifolds 117 and 118 are bolted to the extensions 105 by the bolts 120. Admission from the manifolds 117 and 118 to the valve chambers 104 is controlled by the inlet valves 102. The manifolds 117 and 118 may be connected to two separate carburetors or the manifolds may be joined and connected to a single carburetor, the carburetors not being illustrated.

The inlet valves 102 and the exhaust valves 103 have their valve stems 121 screwed into extensions 122 and secured by lock nuts 123. The extensions 122 are formed with seats 124 for valve springs 125. The extensions 122 slide in bearings 126 formed in the lugs 127 and 128 on the castings 1 and 2, the lugs 127 being curved upward and the lugs 128 curving downward. The bearings 126 are split to allow removal of the valve extensions 122 and are secured by the bolts 129. The inner ends of the valve extensions 122 are bifurcated at 130 to receive rollers 131 rotatably carried by pins 132. The rollers 131 engage cams 133, the ends of the bifurcations 130 extending beyond the rollers 131 and overlapping the cams 133 to retain the rollers in alignment with the cams. Two sets of cams 133 are provided, each set operating a set of inlet valves and a set of exhaust valves for one set of cylinders. The parts of the valve extensions 122 between the bearings 126 and the cams 133 are curved so that the rollers of each set of inlet and exhaust valves come in contact with the cams at equal distances around the cams or, in other words, are spaced equal angles around the cam axis.

Each cam 133 is formed integral with or has secured thereto a gear 134, each cam and gear rotating freely on the crank shaft 55 of the engine. As shown in Fig. 8, the gears 134 mesh with gears 135 secured to shafts 136 and 137. Gears 138 are also secured to the gear shafts 136 and 137 and mesh with gears 139 secured to the crank shaft 55. The rotation of the crank shaft therefore causes the rotation of the cams 133 in the same direction, the ratio of the gears 134 and 135 and 138 and 139 being such that the cams 133 will rotate at one-fourth of the speed of the crank shaft. The gear shafts 136 and 137 rotate in bearings 140 which are formed in extensions of the flanges 5 and the supports 58 and 58'.

As shown in Fig. 4, the ends of the engine are closed by covers preferably formed in two sections 142 and 143 screwed to lugs 141, formed on the extensions 111 of the castings 1 and 2, with machine screws 94. The flanges of the upper covers 142 are bolted to the flanges of the lower covers 143 by the machine screws and nuts 94 (see Fig. 1). The crank shaft 55 and the gear shafts 136 and 137 pass through openings in the covers 142 and 143. A fly-wheel 144 is keyed to the crank shaft and secured by a nut 145. The other crank shaft may be provided with a thrust bearing (not shown) and may be coupled in any suitable manner to a shaft to be driven. A magneto and pump, if desired, may be geared to the gear shaft 137. In starting the engine the fly-wheel may be turned over by a hand crank, electric starter or other suitable means.

The cooling water is delivered by the pump to the water jacket 115 in the extension 114 of the casting 2 through the passage 146, the water circulating up and around the annular chamber 3', its valve chambers, exhaust chamber, and cylinder heads to the top of annular chamber 3' where it leaves through pipe 147 and passes through the hose 50' which connects the pipe 147 to the piston yoke 42'. The water then circulates up and around the piston body 34' and the pistons A', B', C', and D' and is taken from the yoke by the hose 53' and delivered through the pipe 148 and the passage 149 to the water jacket space 115 in the extension 114 on the other side of the partition 116. The water then circulates up and around the annular chamber 3, its valve chambers, exhaust chamber and cylinder heads to the top of annular chamber 3 where it leaves through the pipe 150 and passes through the hose 50 which connects the pipe 150 to the piston yoke 42. Thence it circulates around the piston body 34 and the pistons A, B, C and D, and is taken from the piston yoke by the hose 53 which is connected to the pipe 151 through which the water is returned to the supply tank or other receptacle, or may be led through a cooling radiator.

In Figs. 16 and 17 a modified construction is illustrated. This construction corresponds closely to that already described and parts common to both forms of structure are indicated by like reference characters.

In the modified form shown in these figures, however, the crank 66 on the crank shaft is connected by a pitman or connecting rod 160 to a stud shaft 161 carried by the yoke 72. This connection eliminates the bearing 69, 70, shown in Fig. 7 and is somewhat simpler.

The engine is assembled as follows:

The cylinder heads are bolted to the castings 1 and 2 and the pipes 29 and 30 and 29' and 30' bolted in place. The casting 2 is then placed on the engine foundation. The sliding bearing parts 69 and 70 are placed in their relative positions in the shaft yoke 72. The brace member 74 is then bolted on the yoke. The frames 77 and 77' are next secured to the shaft yoke 72 in their proper relative positions. The horizontal guide rods 79 and 79' are then placed in their respective frames 77 and 77'. Then the rods 86 are threaded into openings 152 in members 81 and 81'. The members 81 and 81' are then mounted on their respective guide rods 79 and 79' and the rods are secured in the sockets 80. The sliding bearings 45 and 45' are then mounted on their respective guide arms 44 and 44' in the piston yokes 42 and 42'. The packing rings 39 are then placed in position and the packing members are fitted to the various pistons and cylinder heads. The bearing 45 with the piston body 34 is then mounted on the arm 78 of the frame 77 and the bearing 45' with the piston body members 34' is then slid onto the arm 78' of the frame 77'.

The two piston bodies 34 and 34' with the frames 77 and 77' and the shaft yoke 72 and the guide rods 79 and 79' with the members 81 and 81' are then lowered into the casting 2, the rods 86 being mounted in the sleeves 87 in the casting 2.

The casting 1 is then lowered onto the casting 2, the packing 28 and the rings 27 having first been put in place, the sleeves 87 sliding over the rods 86. The flanges 4 and 5 of the castings are then secured by the studs and nuts 6. The slide plates 76 are then bolted over the arms 75 of the shaft yoke 72. The four vertical guide rods 83 are then passed through the sockets 84 on the castings and the sleeves 82 in the members 81 and 81' and are secured by the nuts 85. The worm gears 88 and the collars 89 are then secured to the rods 86. The shaft 91 with the worms 90 is then secured in the bearings 92.

The crank shaft 55 is then passed through the piston yokes 42 and 42' the sliding bearing parts 69 and 70 being separated until the crank is in position and then bolted together with the bolts 71. The crank shaft bearings 56 and 56' are then secured in position by the bolts 60. The cams 133 with their gears 134 are mounted on the crank shaft. The gears 139 are then secured to the crank shaft. Gears 135 and 138 are then held in position while the gear shafts 136 and 137 are mounted in the bearings 140 and secured to the gears 135 and 138.

The inlet valves 102 and the exhaust valves 103 are then placed on their proper seats, the valve springs 125 placed over the valve stems 121, and the valve extensions 122 screwed to the valve stems and secured by the lock nuts 123, the rollers 131 being placed in contact with the cams 133. The flanges 119 of the gas manifolds are then bolted to the extensions 105 and the carburetors secured to the manifolds. The pipes 148, 150, and 151 are then secured in place and the hose 50 and 53 and 50' and 53' connected up. The side covers 95 and the top covers 98 and the end covers 142 and 143 are then secured in place. The flywheel is then placed in position on the shaft and secured by the nut 145.

The engine operates as follows:

The pistons A, B, C and D, operate respectively in the cylinders 15, 16, 17 and 18 and the pistons A', B', C' and D' reciprocate respectively in the cylinders 15', 16', 17' and 18'. While the pistons are moving in the direction indicated by the arrow V (Fig. 6), the pistons A', B', C', and D' are moving in the opposite direction indicated by the dashed arrow V'; that is, the pistons A, B, C and D are opposed in direction to the pistons A', B', C' and D'. The piston A reciprocates to the positions shown by the dashed lines $a$ and $b$. The compression space between the piston A and the cylinder head 11 is denoted by $11^a$ and the compression space between the piston A and the cylinder head 12 is denoted by $12^b$. Similarly the other compression spaces will be denoted by $12^a$, $13^b$, $13^a$, $14^b$, $14^a$, and $11^b$ in the cylinders 11, 12, 13 and 14. Likewise the compression spaces in the cylinders 11', 12', 13' and 14' will be denoted by $11'^{a'}$, $12'^{b'}$, $12'^{a'}$, $13'^{b'}$, $13'^{a'}$, $14'^{b'}$, $14'^{a'}$ and $11'^{b'}$. The pistons are double-acting and like operations occur in opposite cylinders at the same time so as to balance the pressure on the piston bodies.

As represented in the drawings, and particularly in Fig. 6, the gas in the compression spaces $11^a$ and its opposite compression space $13^a$ has been fired and the inlet and exhaust valves $11^a$ and $13^a$ are closed. The gas in the compression spaces $12^b$ and $14^b$ is being compressed, the inlet and exhaust valves 102 and 103 for compression spaces $12^b$ and $14^b$ being also closed. The compression spaces $12^a$ and $14^a$ are receiving gas, the inlet and exhaust valves $12^a$ and $14^a$ being open and closed respectively. The compression spaces $13^b$ and $11^b$ are exhausting gas, the inlet and exhaust valves 102 and 103 for these spaces being closed and open respectively. Thus the firing order in the cylinders 11, 12, 13 and 14 is as follows: 11ᵃ and 13ᵃ, 12ᵇ and 14ᵇ, 12ᵃ and 14ᵃ, and 13ᵇ and 11ᵇ.

In like manner in the cylinders 11′, 12′, 13′ and 14′ the firing order at the corresponding moments is as follows: 12′ᵇ′ and 14′ᵇ′, 12′ᵃ′ and 14′ᵃ′, 13′ᵇ′ and 11′ᵇ′, 13′ᵃ′ and 11′ᵃ′. The combined firing order is: 11ᵃ, 13ᵃ, 12′ᵇ′ and 14′ᵇ′; 12ᵇ, 14ᵇ, 12′ᵃ′ and 14′ᵃ′; 12ᵃ 14ᵃ, 13′ᵇ′ and 11′ᵇ′; and 13ᵇ, 11ᵇ, 13′ᵃ′ and 11′ᵃ′.

While the piston yoke 42 reciprocates in the angle denoted by the dotted lines R, the arm 78 working in the sliding bearing 45 moves back and forth to the positions denoted by the dashed circles M and N, being constrained to move along the horizontal line x, y, because the frame 77 of which the arm 78 is a part slides along the horizontal guide rods 79. In like manner the arm 78′ in the sliding bearing 45′ is caused by the reciprocation of the yoke 42′ to move along a parallel line in the same direction and at the same time that the arm 78 moves along the line x, y.

Thus the frames 77 and 77′ moving back-and-forth in the same direction at the same time cause the shaft yoke 72 to reciprocate and with the sliding bearing 69—70 acting on the crank pin cause the shaft to rotate.

The gears 139 fixed on the shaft 55 cause the rotation of the gears 135 and 138 which in turn cause the rotation of the gears 134 and the cams 133 operating the inlet and exhaust valves at the proper time and in the proper sequence.

While the engine is running, the compression spaces can all be simultaneously enlarged or made smaller by rotating the shaft 91 in the desired direction. For instance, if the shaft 91 is rotated in such a direction as to bring the frame 77 and consequently the arm 78 to a position near the axis of the crank shaft, the arm 78 will move along a horizontal line such as H, J, and the piston yoke 42 will be caused to reciprocate to the position denoted by the dot and dash lines S, causing the piston A to reciprocate to the positions indicated by the dot and dash lines P and Q, and the other pistons B, C and D to similar positions. In like manner, at the same time that the arm 78 is lowered to the line H, J, the arm 78′ is raised a corresponding distance, causing the pistons A′, B′, C′ and D′ to reciprocate to positions similar to those shown by the dot and dash lines P and Q.

From the foregoing description it will be evident that an engine has been provided that will develop a maximum amount of power for its weight and will be well balanced and exceptionally free from vibration.

Furthermore, means has been provided for varying the piston stroke and compression space, thereby fitting the engine for use with different grades of fuel and also for use in airplanes, since the compression space can be varied to suit the altitude and rarefied air.

This adjustability of the compression space is also useful when the engine is throttled down as the space or volume may be decreased and may be increased when the engine is opened up.

Although an internal combustion engine has been particularly shown and described, it will be understood that the engine may be made to operate on any other fluid, such as steam. If constructed as a steam engine, the water jackets may be eliminated.

Furthermore, as an internal combustion engine, the engine may be constructed to operate on either the two-cycle or four-cycle principle, although for the purposes of illustration the latter cycle was chosen.

Also, the number of cylinders in each annular chamber may be varied and as many sets of cylinders or annular chambers may be used, as desired.

In conclusion, therefore, although certain specific embodiments of the invention have been particularly shown and described, I do not intend to limit myself to this exact structure, but wish it understood that further changes in the construction and in the arrangement of the various co-operating parts may be made without departing from the spirit or scope of the invention, as expressed in the following claims:

What I claim and desire to secure by Letters Patent is:

1. In an engine, an arcuate cylinder, a piston oscillatable therein and means for changing the stroke of the piston during the operation of the engine.

2. In an engine, a crank shaft, a cylinder disposed circumferentially with respect to said shaft, a piston oscillatable in said cylinder and operatively connected to said shaft and means to vary the compression space in the cylinder.

3. In an engine, a crank shaft, a cylinder disposed circumferentially with respect to said shaft, a piston oscillatable in said cylinder and operatively connected to said shaft and means to vary the compression space in the cylinder during the operation of the engine.

4. In an engine, a crank shaft, a cylinder disposed circumferentially with respect to said shaft, a piston oscillatable in said cylinder and operatively connected to said shaft and means to vary the stroke of the piston.

5. In an engine, a crank shaft, a plurality of cylinders disposed circumferentially with respect to the shaft, and pistons oscillatable in said cylinders and operatively connected to said shaft.

6. In an engine, a crank shaft, a plurality of cylinders disposed circumferentially with respect to the shaft, pistons oscillatable in said cylinders and operatively connected to said shaft and means to simultaneously vary the compression space in each cylinder.

7. In an engine, a crank shaft, a plurality of cylinders disposed circumferentially with respect to the shaft, pistons oscillatable in said cylinders and operatively connected to said shaft and means to simultaneously vary the compression space in each cylinder during the operation of the engine.

8. In an engine, a crank shaft, a plurality of cylinders disposed circumferentially with respect to the shaft, pistons oscillatable in said cylinders and operatively connected to said shaft and means to simultaneously vary the piston stroke in each cylinder.

9. In an engine, a crank shaft, a plurality of cylinders disposed circumferentially with respect to the shaft, pistons oscillatable in said cylinders and operatively connected to said shaft and means to simultaneously vary the piston stroke in each cylinder during the operation of the engine.

10. In an engine, a crank shaft, an annular chamber surrounding said crank shaft, partitions in said chamber forming cylinder heads and dividing the chamber into a plurality of cylinders, a member oscillatable in said chamber and having radially extending portions disposed in said cylinders and forming pistons and means operatively connecting said oscillatable member to said crank shaft.

11. In an engine, a crank shaft, an annular chamber surrounding said crank shaft, partitions in said chamber forming cylinder heads and dividing the chamber into a plurality of cylinders, a member oscillatable in said chamber forming the inner wall of said chamber and having outwardly extending portions disposed in said cylinders and forming pistons and means operatively connecting said oscillatable member to said crank shaft.

12. In an engine, a crank shaft, an annular chamber surrounding said crank shaft, partitions in said chamber forming cylinder heads and dividing the chamber into a plurality of cylinders, a member oscillatable in said chamber forming the inner wall of said chamber and having outwardly extending portions disposed in said cylinders and forming pistons, means operatively connecting said oscillatable member to said crank shaft and packing members between the chamber partitions and said member and between said pistons and the cylinder walls.

13. In an engine, a crank shaft, an annular chamber surrounding said crank shaft, partitions in said chamber forming cylinder heads and dividing the chamber into a plurality of cylinders, a member oscillatable in and surrounded by said chamber and having outwardly extending portions disposed in said cylinders and forming pistons, means operatively connecting said oscillatable member to said crank shaft and inlet and exhaust valves in each cylinder.

14. In an engine, a crank shaft, an annular chamber surrounding said crank shaft, partitions in said chamber forming cylinder heads and dividing the chamber into a plurality of cylinders, a member oscillatable in said chamber and having outwardly extending portions disposed in said cylinders and forming pistons, means operatively connecting said oscillatable member to said crank shaft and means for varying the degree of oscillation of said oscillatable member.

15. In an engine, a crank shaft, an annular chamber surrounding said crank shaft, partitions in said chamber forming cylinder heads and dividing the chamber into a plurality of cylinders, a member oscillatable in said chamber and having outwardly extending portions disposed in said cylinders and forming pistons, means operatively connecting said oscillatable member to said crank shaft and means for varying the degree of oscillation of said oscillatable member during the operation of the engine.

16. In an engine, a crank shaft, a plurality of cylinders disposed circumferentially with respect to the shaft, pistons oscillatable in said cylinders and operatively connected to said shaft, water jackets on said cylinders, water jackets in said pistons and a continuous circulation system for said jackets.

17. In an engine, a crank shaft, a plurality of sets of circumferentially disposed cylinders encircling said shaft, a piston oscillatable in each cylinder of each set and operative connections between said pistons and the crank shaft.

18. In an engine, a crank shaft, a plurality of sets of circumferentially disposed cylinders encircling said shaft, a double acting piston oscillatable in each cylinder of each set, means for admitting and exhausting an actuating fluid on each side of each piston and operative connections between said pistons and the crank shaft.

19. In an engine, a crank shaft, an annular chamber surrounding said crank shaft, partitions in said chamber forming cylinder heads and dividing the chamber into a plurality of cylinders, a member oscillatable in said chamber and having outwardly extending portions disposed in said cylinders and forming pistons and adjustable means operatively connecting said oscillatable member to said crank shaft.

20. In an engine, a crank shaft, a plurality of cylinders disposed circumferentially with respect to the shaft, and pistons oscillatable in said cylinders and adjustably connected to said shaft.

21. In an engine, a crank shaft, a plurality of sets of circumferentially disposed cylinders encircling said shaft, a piston oscillatable in each cylinder of each set, operative connections between said pistons and the crank shaft and means for simultaneously varying the stroke of each of said pistons.

22. In an engine, a crank shaft, a pair of multiple cylinder units, pistons in the cylinders of said units, operative connections between said pistons and said shaft and means for simultaneously changing the stroke of each of said pistons during the operation of the engine.

23. In an engine, a crank shaft, a pair of multiple cylinder units, pistons in the cylinders of said units, operative connections between said pistons and said shaft and means for simultaneously changing the stroke of each of said pistons.

24. In an engine, a crank shaft, a pair of multiple cylinder units, pistons in the cylinders of said units, operative connections between said pistons and said shaft and means for simultaneously lengthening or shortening the stroke of each of said pistons during the operation of the engine.

25. In an engine, a crank shaft, a pair of multiple cylinder units, pistons in the cylinders of said units, operative connections between said pistons and said shaft and means for simultaneously changing the compression space in each of the cylinders.

26. In an engine, a crank shaft, a pair of multiple cylinder units, pistons in the cylinders of said units, operative connections between said pistons and said shaft and means for simultaneously changing the compression space in each of the cylinders at each end thereof.

27. In an engine, a crank shaft having a crank, a plurality of cylinders circumferentially arranged around said shaft, pistons in said cylinders, a member secured to said pistons and disposed between the cylinders and the shaft, a yoke connected to the crank on the crank shaft, and adjustable connecting means between said yoke and said member.

28. In an engine, a crank shaft, a pair of annular chambers encircling said shaft, partitions in each chamber forming cylinders therein, an oscillatable body member disposed between each chamber and the crank shaft and forming the inner wall of the chamber, pistons carried by each body member and disposed within the cylinders and adjustable connections between said body members and said crank shaft.

29. In an engine, a crank shaft, an annular chamber surrounding said shaft, a plurality of cylinders in said chamber, an oscillatable body member disposed between the chamber and said crank shaft and forming the inner wall of said chamber and cylinders and adjustable packing means between the body member and the side walls of said chamber.

30. In an engine, a crank shaft, an annular chamber surrounding said shaft, a plurality of cylinders in said chamber, an oscillatable body member disposed between the chamber and said crank shaft and forming the inner wall of said chamber and cylinders and packing means between the body member and the side walls of said chamber and means for adjusting said packing means to take up wear.

31. In combination, a pair of relatively movable members, a packing member positioned between said members having a plurality of ribs coacting with ribs on one of the relatively movable members to pack the joint between said relatively movable members and means for adjusting the packing member to take up wear.

32. An engine comprising a crank shaft, a plurality of sets of cylinders circumferentially arranged with respect to said shaft and disposed side by side in spaced relation, pistons oscillatable in said cylinders and a yoke operatively connected to said crank shaft and to the pistons in each set of cylinders.

33. An engine comprising a crank shaft, a plurality of sets of cylinders circumferentially arranged with respect to said shaft and disposed side by side in spaced relation, pistons oscillatable in said cylinders and a yoke disposed between the sets of cylinders and operatively connected to said crank shaft and to the pistons in each set of cylinders.

34. An engine comprising a crank shaft, a plurality of sets of cylinders circumferentially arranged with respect to said shaft and disposed side by side in spaced relation, pistons oscillatable in said cylinders, a yoke operatively connected to said crank shaft and to the pistons in each set of cylinders, and means for changing the stroke of said pistons.

35. An engine comprising a crank shaft, a plurality of sets of cylinders circumferentially arranged with respect to said shaft and disposed side by side in spaced relation, pistons oscillatable in said cylinders, a yoke operatively connected to said crank shaft and to the pistons in each set of cylinders, and means for simultaneously changing the stroke of all of said pistons.

36. An engine comprising a crank shaft, a plurality of sets of cylinders circumferentially arranged with respect to said shaft and disposed side by side in spaced relation, pistons oscillatable in said cylinders, a yoke operatively connected to said crank shaft and to the pistons in each set of cylinders, and means for changing the stroke of said piston during the operation of the engine.

37. An engine comprising a crank shaft, a plurality of sets of cylinders circumferentially arranged with respect to said shaft and disposed side by side in spaced relation, pistons oscillatable in said cylinders, a yoke operatively connected to said crank shaft and to the pistons in each set of cylinders, and means for simultaneously changing the stroke of all of said pistons during the operation of the engine.

38. An engine comprising a crank shaft, a plurality of sets of cylinders circumferentially arranged with respect to said shaft and disposed side by side in spaced relation, pistons oscillatable in said cylinders and operative connections between said sets of pistons and the crank shaft and means for changing the stroke of the pistons.

39. An engine comprising a crank shaft, a plurality of sets of cylinders circumferentially arranged with respect to said shaft and disposed side by side in spaced relation, pistons oscillatable in said cylinders and operative connections between said sets of pistons and the crank shaft and means for simultaneously changing the stroke of the pistons during the operation of the engine.

40. An engine comprising a crank shaft, a pair of sets of cylinders circumferentially arranged with respect to said shaft, pistons operable in each set of cylinders, a yoke connected to said crank shaft, and operative connections between one set of pistons and the yoke above the axis of the shaft and operative connections between the other set of pistons and the yoke below the axis of the shaft, the two sets of pistons being adapted to oscillate simultaneously in opposite directions.

41. An engine comprising a crank shaft, a pair of sets of cylinders circumferentially arranged with respect to said shaft, pistons operable in each set of cylinders, a yoke connected to said crank shaft, and operative connections between one set of pistons and the yoke above the axis of the shaft and operative connections between the other set of pistons and the yoke below the axis of the shaft, the two sets of pistons being adapted to oscillate simultaneously in opposite directions, said yoke being disposed between said sets of cylinders.

42. An engine comprising a crank shaft, a pair of sets of cylinders circumferentially arranged with respect to said shaft, pistons operable in each set of cylinders, a yoke connected to said crank shaft, operative connections between one set of pistons and the yoke above the axis of the shaft, operative connections between the other set of pistons and the yoke below the axis of the shaft, the two sets of pistons being adapted to oscillate simultaneously in opposite directions, said yoke being disposed between said sets of cylinders, and means for moving the connections between the pistons and yoke toward or away from said crank shaft.

43. An engine comprising a crank shaft, a pair of sets of cylinders circumferentially arranged with respect to said shaft, pistons operable in each set of cylinders, a yoke connected to said crank shaft, operative connections between one set of pistons and the yoke above the axis of the shaft, operative connections between the other set of pistons and the yoke below the axis of the shaft, the two sets of pistons being adapted to oscillate simultaneously in opposite directions, said yoke being disposed between said sets of cylinders, and means for simultaneously moving the connections between all of the pistons and yoke toward or away from said crank shaft.

44. An engine comprising a crank shaft, a pair of sets of cylinders circumferentially arranged with respect to said shaft, pistons operable in each set of cylinders, a yoke connected to said crank shaft, operative connections between one set of pistons and the yoke above the axis of the shaft, operative connections between the other set of pistons and the yoke below the axis of the shaft, the two sets of pistons being adapted to oscillate simultaneously in opposite direction, said yoke being disposed between said sets of cylinders, and means for simultaneously moving the connections between all of the pistons and yoke toward or away from said crank shaft, during the operation of the engine.

45. In an engine, a crank shaft, a plurality of cylinders circumferentially arranged around said shaft, a piston in each cylinder, inlet and exhaust valves at each end of each cylinder and means for simultaneously changing the compression space at each end of each cylinder during the operation of the engine.

46. In an engine, a crank shaft, a plurality of cylinders circumferentially arranged around said shaft, a piston in each cylinder, inlet and exhaust valves at each end of each cylinder and means for simultaneously changing the stroke of each piston while the engine is operating.

47. An engine comprising a crank shaft, a pair of sets of cylinders circumferentially arranged with respect to said shaft as a center, pistons operable in each set of cylinders and operative connections between one set of pistons and the crank shaft above the axis of the shaft and operative connections between the other set of pistons and the crank shaft below the axis of the shaft, the two sets of pistons being adapted to oscillate simultaneously in opposite directions.

48. An engine comprising a crank shaft, a pair of sets of cylinders circumferentially arranged with respect to said shaft, pistons operable in each set of cylinders and operative connections between one set of pistons and the crank shaft above the axis of the shaft and operative connections between the other set of pistons and the crank shaft below the axis of the shaft, and inlet and exhaust ports at each end of each cylinder and port control means so constructed and arranged that the two sets of pistons will oscillate simultaneously in opposite directions.

49. In an engine, a crank shaft, an annular chamber surrounding said shaft, partitions in said chamber forming a plurality of cylinders, said cylinders occupying the entire circumference of said annular chamber, a double acting piston in each cylinder and operative connections between said pistons and said crank shaft.

In witness whereof, I have hereunto set my hand this 29th day of August, 1921.

HOWARD S. THORPE.